US009674061B2

(12) United States Patent
Tamura

(10) Patent No.: US 9,674,061 B2
(45) Date of Patent: Jun. 6, 2017

(54) MANAGEMENT SYSTEM, MANAGEMENT APPARATUS AND MANAGEMENT METHOD

(71) Applicant: FUJITSU LIMITED, Kawasaki-shi, Kanagawa (JP)

(72) Inventor: Naohiro Tamura, Yokohama (JP)

(73) Assignee: FUJITSU LIMITED, Kawasaki (JP)

( * ) Notice: Subject to any disclaimer, the term of this patent is extended or adjusted under 35 U.S.C. 154(b) by 195 days.

(21) Appl. No.: 13/902,040

(22) Filed: May 24, 2013

(65) Prior Publication Data
US 2013/0262670 A1 Oct. 3, 2013

Related U.S. Application Data

(63) Continuation of application No. PCT/JP2010/071180, filed on Nov. 26, 2010.

(51) Int. Cl.
G06F 15/173 (2006.01)
H04L 12/26 (2006.01)
(Continued)

(52) U.S. Cl.
CPC ........ *H04L 43/0817* (2013.01); *G06F 21/445* (2013.01); *G06F 21/554* (2013.01); *H04L 41/0631* (2013.01)

(58) Field of Classification Search
CPC ...... G06F 9/505; G06F 21/445; G06F 21/554; G06F 2221/2101; H04L 41/0631; H04L 43/0817; H04L 67/32; H04L 12/26
(Continued)

(56) References Cited

U.S. PATENT DOCUMENTS 6,237,024 B1 * 5/2001 Wollrath ................. G06F 9/485
709/203
6,697,972 B1 * 2/2004 Oshima ............... G06F 11/0751
714/55
(Continued)

FOREIGN PATENT DOCUMENTS

JP 08235134 A * 9/1996
JP 11-85649 3/1999
(Continued)

OTHER PUBLICATIONS

International Search Report mailed on Feb. 15, 2011 in corresponding International Application No. PCT/JP2010/071180.
(Continued)

Primary Examiner — Benjamin M Thieu
(74) Attorney, Agent, or Firm — Staas & Halsey LLP

(57) ABSTRACT

A management system includes an application source node that applies for subscription of alive and dead state information to a node to be monitored, a node to be monitored that interconnects with the application source node and makes a request to a node whose routing table includes the node to be monitored for monitoring the node to be monitored and notifying the application source node of a monitoring result when receiving the subscription application, and a monitoring node that monitors the node to be monitored when receiving the request from the node to be monitored and makes a notification to the application source node when a response from the node to be monitored stops. The application source node determines that the node to be monitored stops when communication with the node to be monitored is disconnected and the notification is received from the monitoring node.

5 Claims, 13 Drawing Sheets

(51) Int. Cl.
*H04L 12/24* (2006.01)
*G06F 21/44* (2013.01)
*G06F 21/55* (2013.01)

(58) Field of Classification Search
USPC .......................................... 709/224–226, 203
See application file for complete search history.

(56) References Cited

U.S. PATENT DOCUMENTS

| | | | | |
|---|---|---|---|---|
| 7,929,550 | B2* | 4/2011 | Namihira et al. | 370/401 |
| 8,930,539 | B1* | 1/2015 | Rajaa | G06F 11/00 709/226 |
| 2002/0095627 | A1* | 7/2002 | Kitamura | 714/51 |
| 2003/0061339 | A1* | 3/2003 | Benfield et al. | 709/224 |
| 2004/0167978 | A1* | 8/2004 | Kitayama | H04L 41/0681 709/224 |
| 2005/0055418 | A1* | 3/2005 | Blanc | H04L 41/30 709/209 |
| 2006/0029076 | A1* | 2/2006 | Namihira et al. | 370/392 |
| 2006/0101026 | A1* | 5/2006 | Fukushima | H04L 29/06 |
| 2006/0167921 | A1* | 7/2006 | Grebus et al. | 707/102 |
| 2007/0121490 | A1* | 5/2007 | Iwakawa et al. | 370/218 |
| 2007/0232297 | A1* | 10/2007 | Noda et al. | 455/426.2 |
| 2008/0140836 | A1* | 6/2008 | Miyawaki | A63F 13/12 709/225 |
| 2008/0144519 | A1* | 6/2008 | Cooppan | H04L 43/0817 370/252 |
| 2008/0281959 | A1* | 11/2008 | Robertson | H04L 43/0817 709/224 |
| 2009/0037573 | A1 | 2/2009 | Qiu et al. | |
| 2009/0059810 | A1* | 3/2009 | Kawai | B60T 8/885 370/252 |
| 2009/0100165 | A1* | 4/2009 | Wesley, Sr. | G06F 17/30424 709/223 |
| 2009/0204981 | A1* | 8/2009 | Karino et al. | 719/328 |
| 2009/0238182 | A1* | 9/2009 | Yanagihara | 370/390 |
| 2009/0323537 | A1 | 12/2009 | Yamamoto et al. | |
| 2010/0014414 | A1* | 1/2010 | Hirata | 370/216 |
| 2010/0036956 | A1* | 2/2010 | Nishikawa | 709/226 |
| 2010/0185901 | A1 | 7/2010 | Hirsch | |

FOREIGN PATENT DOCUMENTS

| | | |
|---|---|---|
| JP | 2007-189615 | 7/2007 |
| JP | 2009-77216 | 4/2009 |
| JP | 2010-11374 | 1/2010 |
| JP | 2010-98591 | 4/2010 |

OTHER PUBLICATIONS

Extended European Search Report dated Apr. 11, 2017 from European Patent Application No. 10860089.1, 16 pages.

* cited by examiner

FIG.8

DHT (DISTRIBUTED HASH TABLE) DEFINITION

| Key (HASH BY SHA-1) | Value |
|---|---|
| SERVER NAME | {server, server name, key, {IP list}, {WWN list}, manager-flag, {domain, domain name, key} } |
| VM HOST NAME | {vmhost, VM host name, key, {IP list}, {domain, domain name, key}, {vmguest, {VM guest key list}} } |
| VM GUEST NAME | {vmguest, VM guest name, key, {IP list}, {vmhost, VM host name, key,} } |
| SWITCH NAME | {switch, switch name, key, {IP list}, {domain, domain name, key} } |
| STORAGE NAME | {storage, storage name, key, {IP list}, {WWN list}, {domain, domain name, key} } |
| USER NAME | {user, user name, key, {group, {group key list} } |
| GROUP NAME | {group, group name, key, {user, {user key list} } |
| DOMAIN NAME | {domain, domain name, key, {manager, {manager key list} } |

FIG.9

(1) Self Node Table

| TYPE | NODE NAME | Key | IP | WWN |
|---|---|---|---|---|
| vmhost | vmhost1.domain1.company.com | 100 | 10.20.30.40 | 10:00:00:60:69:00:23:74 |
| vmguest | vmguest11.domain1.company.com | 55 | 10.20.30.41 | null |
| vmguest | vmguest12.domain1.company.com | 70 | 10.20.30.42 | null |
| vmguest | vmguest13.domain1.company.com | 85 | 10.20.30.43 | null |
| vmguest | vmguest14.domain1.company.com | 90 | 10.20.30.44 | null |

FIG.10

(2) Domain Table

| TYPE | NODE NAME | Key | Manager Key |
|---|---|---|---|
| domain | domain1.company.com | 5 | 15, 100 |

FIG.11

(3) Node Table

| TYPE | NODE NAME | Key | Domain Key | Manager | Managed | ALIVE AND DEAD STATE MONITORING FLAG | ALIVE AND DEAD STATE MONITORING NOTIFICATION DESTINATION |
|---|---|---|---|---|---|---|---|
| vmhost | vmhost2.domain1.company.com | 1 | 5 | false | true | false | |
| server | server1.domain1.company.com | 15 | 5 | true | true | false | |
| server | server2.domain1.company.com | 20 | 5 | false | true | false | |
| vmguest | vmguest11.domain1.company.com | 55 | 5 | false | true | NULL | |
| server | server3.domain1.company.com | 66 | 5 | false | true | true | |
| vmguest | vmguest12.domain1.company.com | 70 | 5 | false | true | NULL | |
| vmhost | vmhost3.domain1.company.com | 75 | 5 | false | true | true | |
| vmguest | vmguest13.domain1.company.com | 85 | 5 | false | true | NULL | |
| vmguest | vmguest14.domain1.company.com | 90 | 5 | true | true | NULL | |
| vmhost | vmhost1.domain1.company.com | 100 | 5 | false | true | NULL | |
| switch | switch1.domain1.company.com | 110 | 5 | false | true | NULL | |
| storage | storage1.domain1.company.com | 115 | 5 | false | true | NULL | |
| vmguest | vmguest21.domain1.company.com | 120 | 5 | false | true | NULL | |

FIG.12

(4) Routing Table (OF NODE OF Key 100)

| distance | NODE NAME | Destination | Destination IP |
|---|---|---|---|
| 1 | vmhost1.domain1.company.com | 1 | a1.b1.c1.d1 |
| 2 | vmhost2.domain1.company.com | 1 | a1.b1.c1.d1 |
| 3 | vmhost2.domain1.company.com | 1 | a1.b1.c1.d1 |
| 5 | vmhost2.domain1.company.com | 1 | a1.b1.c1.d1 |
| 9 | vmhost2.domain1.company.com | 1 | a1.b1.c1.d1 |
| 17 | vmhost2.domain1.company.com | 1 | a1.b1.c1.d1 |
| 33 | node1.domain2.company.com | 4 | a4.b4.c4.d4 |
| 65 | node3.domain2.company.com | 36 | a36.b36.c36.d36 |

US 9,674,061 B2

MANAGEMENT SYSTEM, MANAGEMENT APPARATUS AND MANAGEMENT METHOD

CROSS-REFERENCE TO RELATED APPLICATION

This application is a continuation of International Application No. PCT/JP2010/071180, filed on Nov. 26, 2010 and designating the U.S., the entire contents of which are incorporated herein by reference.

FIELD

The present invention relates to a management system, a management apparatus and a management method.

BACKGROUND

Conventionally, to manage a large-scale network system, a technique to hierarchize an operation management manager, which is an operation management apparatus, has been used. As an example of such a large-scale system environment management, there is an operation management of a distributed computer system in a large-scale data center or the like. Various techniques for monitoring whether a node is dead or alive on a network are known.

Patent Document 1: Japanese Laid-open Patent Publication No. 11-85649
Patent Document 2: Japanese Laid-open Patent Publication No. 2009-77216

When performing operation management of a network of a large-scale data center or the like by hierarchizing an operation management manager, for example, LinkUp and LinkDown events by polling and SNMP (Simple Network Management Protocol) Trap are sequentially transmitted to managers in each hierarchy. Therefore, there is a problem that a time lag occurs in detecting the LinkUp and LinkDown events. Further, CPU (Central Processing Unit) utilization of the managers and network traffic increase due to periodic polling from the managers to objects to be managed.

SUMMARY

According to an aspect of an embodiment of the invention, a management system includes an application source node that applies for subscription of alive and dead state information to a node to be monitored, a node to be monitored that interconnects with the application source node and makes a request to a node whose routing table includes the node to be monitored for monitoring the node to be monitored and notifying the application source node of a monitoring result when receiving the subscription application, and a monitoring node that monitors the node to be monitored when receiving the request from the node to be monitored and makes a notification to the application source node when a response from the node to be monitored stops. The application source node determines that the node to be monitored stops when communication with the node to be monitored is disconnected and the notification is received from the monitoring node.

The object and advantages of the embodiment will be realized and attained by means of the elements and combinations particularly pointed out in the claims.

It is to be understood that both the foregoing general description and the following detailed description are exemplary and explanatory and are not restrictive of the embodiment, as claimed.

BRIEF DESCRIPTION OF DRAWINGS

FIG. 8 is an illustration of a specific example of a definition of a hash table;
FIG. 9 is a specific example of a self node table t2 illustrated in FIG. 3;
FIG. 10 is a specific example of a domain table t3 illustrated in FIG. 3;
FIG. 11 is a specific example of a node management table t4 illustrated in FIG. 3;
FIG. 12 is a specific example of a routing table t5 illustrated in FIG. 3.

DESCRIPTION OF EMBODIMENTS

Hereinafter, the management system, the management apparatus, the management method, and the management program according to the present invention will be described in detail with reference to the drawings. The embodiment does not limit the disclosed technique.

Figure 1:
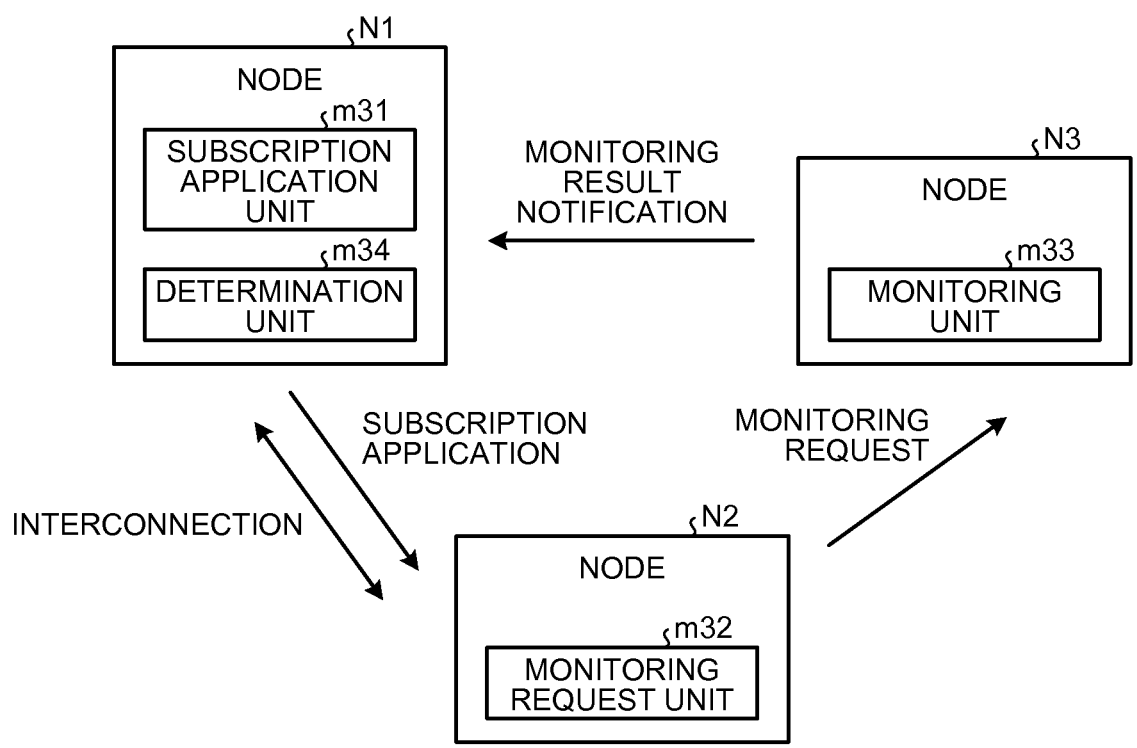
FIG. 1 is an illustration of a management system according to an embodiment.

FIG. 1 is an illustration of the management system according to the embodiment. A node N1 illustrated in FIG. 1 is an application source node including a subscription application unit m31 which applies for subscription of alive and dead state information to a node to be monitored N2. The node N1 includes a determination unit m34 in addition to the subscription application unit m31.

The node N2, which is a node to be monitored, interconnects with the node N1 when receiving the subscription application from the node N1. The node N2 includes a monitoring request unit m32 which requests a node N3 including the node N2 in a routing table to monitor the node N2 and notify the application source node N1 of a monitoring result.

The node N3 is a monitoring node which receives a request from the node to be monitored N2 and monitors the node to be monitored N2. The node N3 includes a monitoring unit m33 which, when a response from the node to be monitored N2 stops, notifies the application source node N1 accordingly.

The determination unit m34 of the application source node N1 determines that the node to be monitored N2 stops when communication with the node to be monitored N2 is disconnected and notification from the monitoring node N3 is received.

The determination unit m34 determines that a problem occurs in a communication line with the node to be monitored N2 when the communication with the node to be monitored N2 is disconnected and no notification is received from the monitoring node N3.

In this way, the application source node N1 interconnects with the node to be monitored N2, causes the monitoring node N3 to monitor the node to be monitored N2, and performs determination by combining the direct response from the node N2 and the notification from the monitoring node N3.

Therefore, the alive and dead state change event is directly transmitted from an object to be managed to a manager without passing through the hierarchized management managers, so that it is possible to reduce the time lag and quickly detect the state change of the object to be managed. The manager subscribes an alive and dead state monitoring service provided by another object to be managed, so that the manager can obtain the alive and dead state change event from the object to be managed. When the manager does not need the alive and dead state monitoring service, the manager can stop the subscription at any time. Based on the management system as described above, the manager need not poll the object to be managed and the manager can receive the alive and dead state change event as a message, so that it is possible to reduce the CPU utilization of the manager and the network traffic. Further, it is possible to distinguish between a failure of the node to be monitored N2 and a failure of the network.

Although the application source node, the node to be monitored, and the monitoring node are separately described in FIG. 1, each node is preferable to operate as any one of the application source node, the node to be monitored, and the monitoring node.

Figure 2:
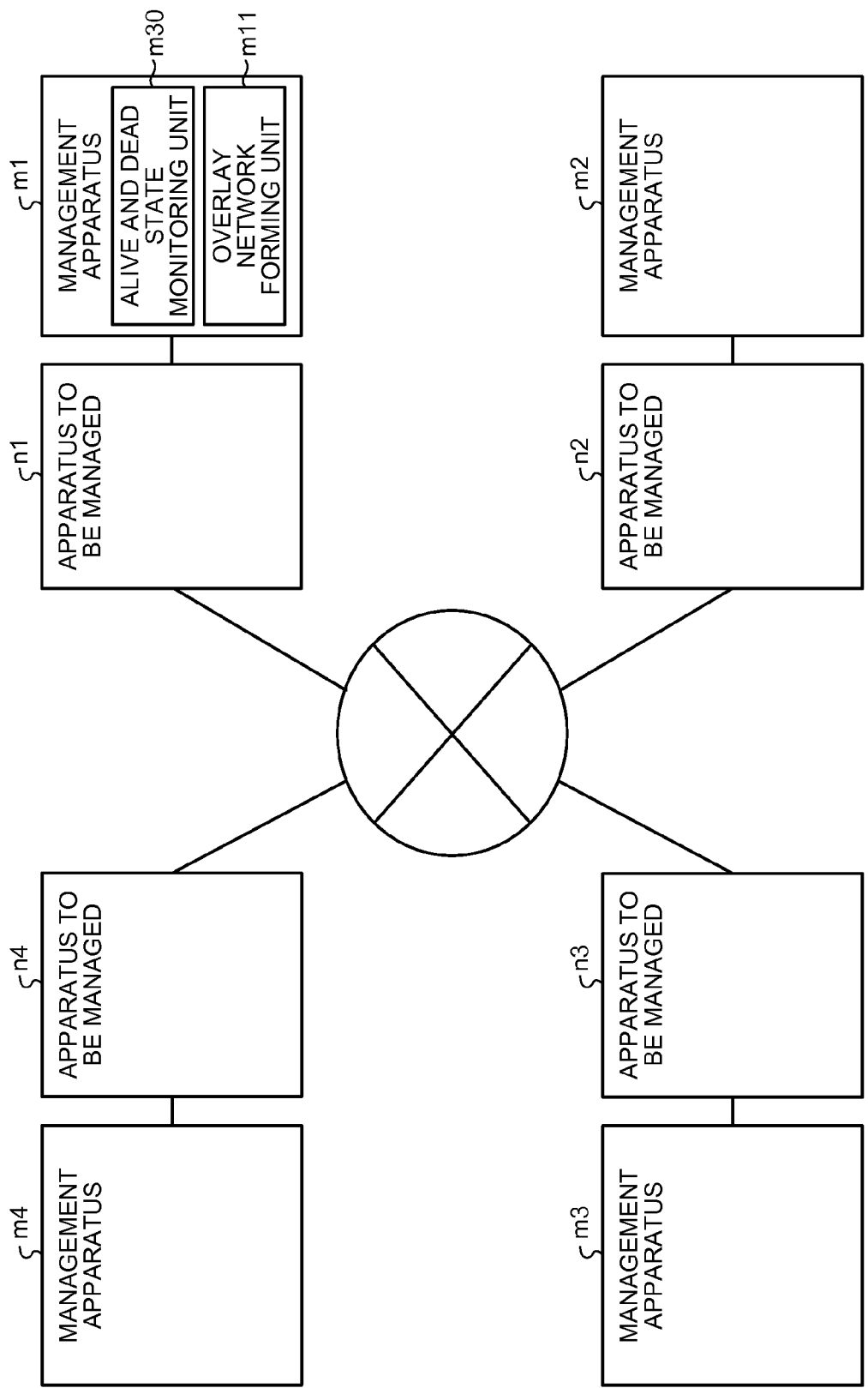
FIG. 2 is an illustration of a network according to the embodiment.
Figure 3:
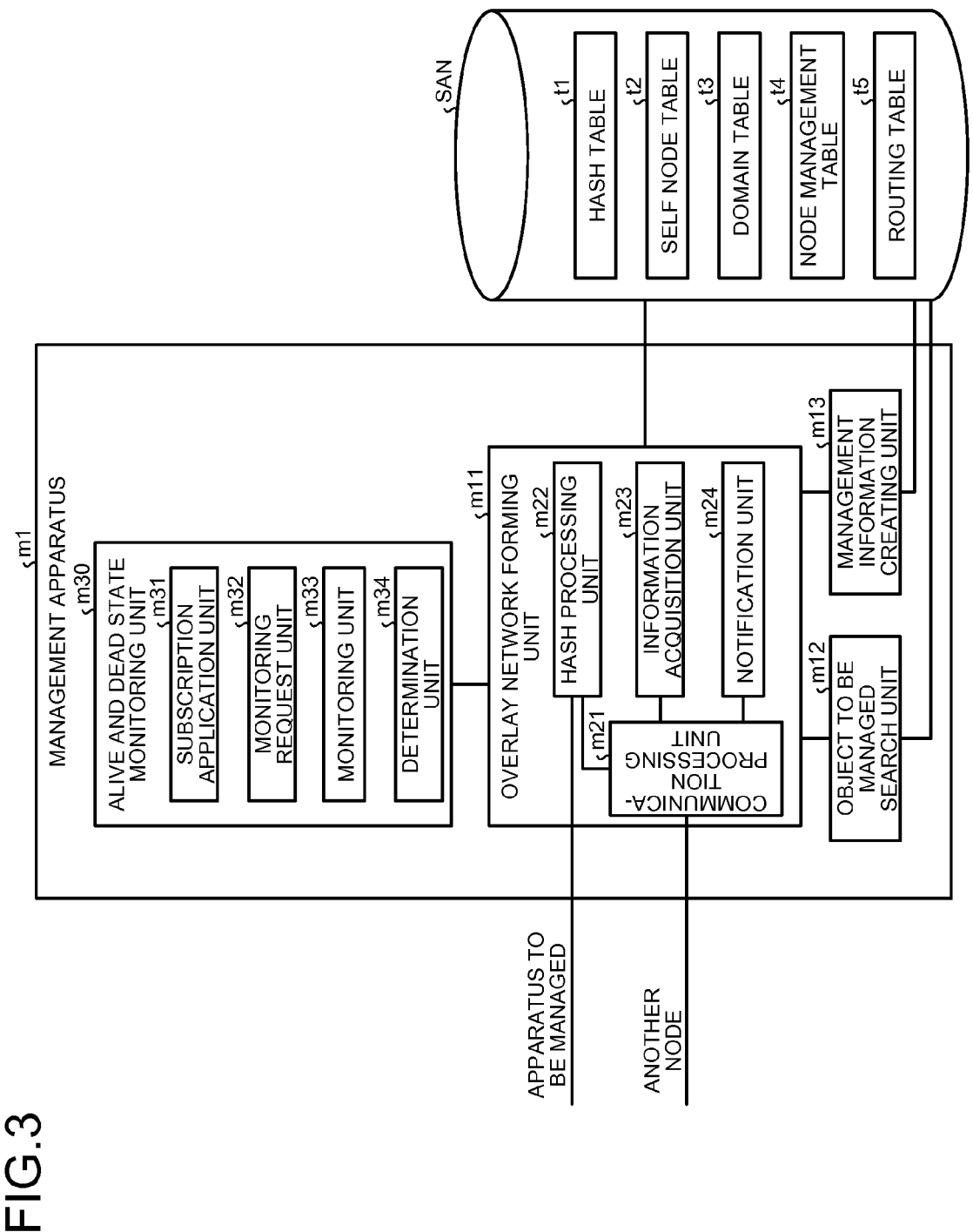
FIG. 3 is a configuration diagram of a management apparatus according to the embodiment.

FIG. 2 is an illustration of a network according to the embodiment. FIG. 3 is a configuration diagram of a management apparatus according to the embodiment. As illustrated in FIG. 2, apparatuses n1 to n4 to be managed are connected to each other through a network. The network is a network to be monitored.

A management apparatus m1 is connected to the apparatus n1 to be managed, a management apparatus m2 is connected to the apparatus n2 to be managed, and a management apparatus m3 is connected to the apparatus n3 to be managed. The management apparatuses m1 to m4 form an overlay network on a network to which the apparatuses n1 to n4 to be managed belong by using network interfaces of the apparatuses n1 to n4 to be managed. The management apparatuses m1 to m4 function as nodes of the overlay network and can communicate with each other.

Since the management apparatuses m1 to m4 have the same configuration, hereinafter, the management apparatus m1 will be described as an example. The management apparatus m1 includes an alive and dead state monitoring unit m30 and an overlay network forming unit m11.

More specifically, as illustrated in FIG. 3, the management apparatus m1 includes the overlay network forming unit m11, an object to be managed search unit m12, a management information creating unit m13, and the alive and dead state monitoring unit m30. The management apparatus m1 connects to a SAN (Storage Area Network) and causes the SAN to hold various information described below.

The overlay network forming unit m11 is a processing unit that forms the overlay network on a network to be managed and includes a communication processing unit m21, a hash processing unit m22, an information acquisition unit m23, and a notification unit m24.

The communication processing unit m21 performs a process to communicate with another node on a network in which an apparatus to be managed to which the management apparatus is directly connected joins as a node. The hash processing unit m22 obtains a hash value from information acquired by the communication processing unit m21 from another node and information of the apparatus to be managed and uses the obtained hash value as a key of the overlay network. The information acquisition unit m23 is a processing unit that acquires information from another node in the overlay network through the communication processing unit m21. The notification unit m24 is a processing unit that notifies another node in the overlay network of information through the communication processing unit m21.

The object to be managed search unit m12 performs a process to search for a node which is an apparatus to be managed to which the management apparatus m1 is directly connected and which is a node belonging to the same management range as that of the node of the management apparatus m1 from the overlay network formed by the overlay network forming unit m11.

The management information creating unit m13 creates management information in which the node obtained by the search of the object to be managed search unit m12 is set to a node to be managed.

The alive and dead state monitoring unit m30 includes a subscription application unit m31, a monitoring request unit m32, a monitoring unit m33, and a determination unit m34. The subscription application unit m31 is a processing unit that applies for subscription of the alive and dead state information to the node to be monitored.

The monitoring request unit m32 is a processing unit that interconnects with an application source node and requests a node whose routing table includes the node of the management apparatus m1 to monitor the node of the management apparatus m1 and notify the application source node of a monitoring result when accepting an application of subscription from another node.

The monitoring unit m33 is a processing unit which, when receiving a request from another node to monitor the node and notify the application source node of a monitoring result, monitors the node and notifies the application source node of the monitoring result when a response from the node stops.

The determination unit m34 determines that the node to be monitored stops when communication with the node to be monitored is disconnected and notification from the monitoring node that monitors the node to be monitored is received.

In other words, the subscription application unit m31 and the determination unit m34 are processing units that cause the management apparatus m1 to operate as an application source node. The monitoring request unit m32 is a processing unit that causes the management apparatus m1 to operate as a node to be monitored. The monitoring unit m33 is a processing unit that causes the management apparatus m1 to operate as a monitoring node.

The management apparatus m1 is preferred to be implemented as a management program that runs on a computer which is the apparatus to be managed. In an example illustrated in FIG. 4, each of a domain A and a domain B includes three servers and the domain A and the domain B can communicate with each other.

In one of the servers in the domain A, a VM (Virtual Machines) host program that virtually realizes an operation environment of another computer system is running. Four VM guest programs are running on the VM host program. In the server, an operation management program is further running on the VM host program. The operation management program running on the VM host program causes the server to function as a management apparatus. The apparatus to be managed by the operation management program is the server itself and the VM host program and the VM guest programs running on the server.

In one of the servers in the domain A, an OS (Operating System) is running and an operation management program is running on the OS. A switch and a router are connected to the server. The operation management program running on the OS of the server causes the server to function as a management apparatus. The apparatuses to be managed by the operation management program are the server itself and the switch and router connected to the server.

In one of the servers in the domain A, an OS (Operating System) is running and an operation management program is running on the OS. A storage is connected to the server. The operation management program running on the OS of the server causes the server to function as a management apparatus. The apparatuses to be managed by the operation management program are the server itself and the storage connected to the server.

In the same manner as in the domain A, regarding the three servers included in the domain B, the VM host program on the server and the operation management programs on the OS are running and the programs cause the each server to function as a management apparatus. Therefore, each server, various programs running on each server, and hardware connected to each server are managed by the operation management program running on a corresponding server.

The operation management programs on each server communicate with each other and form an overlay network. In addition, the operation management program can collect information of other nodes in the domain to which the operation management program belongs and create management information. The operation management program can be operated from a terminal that can be accessed from both domains A and B.

Figure 4:
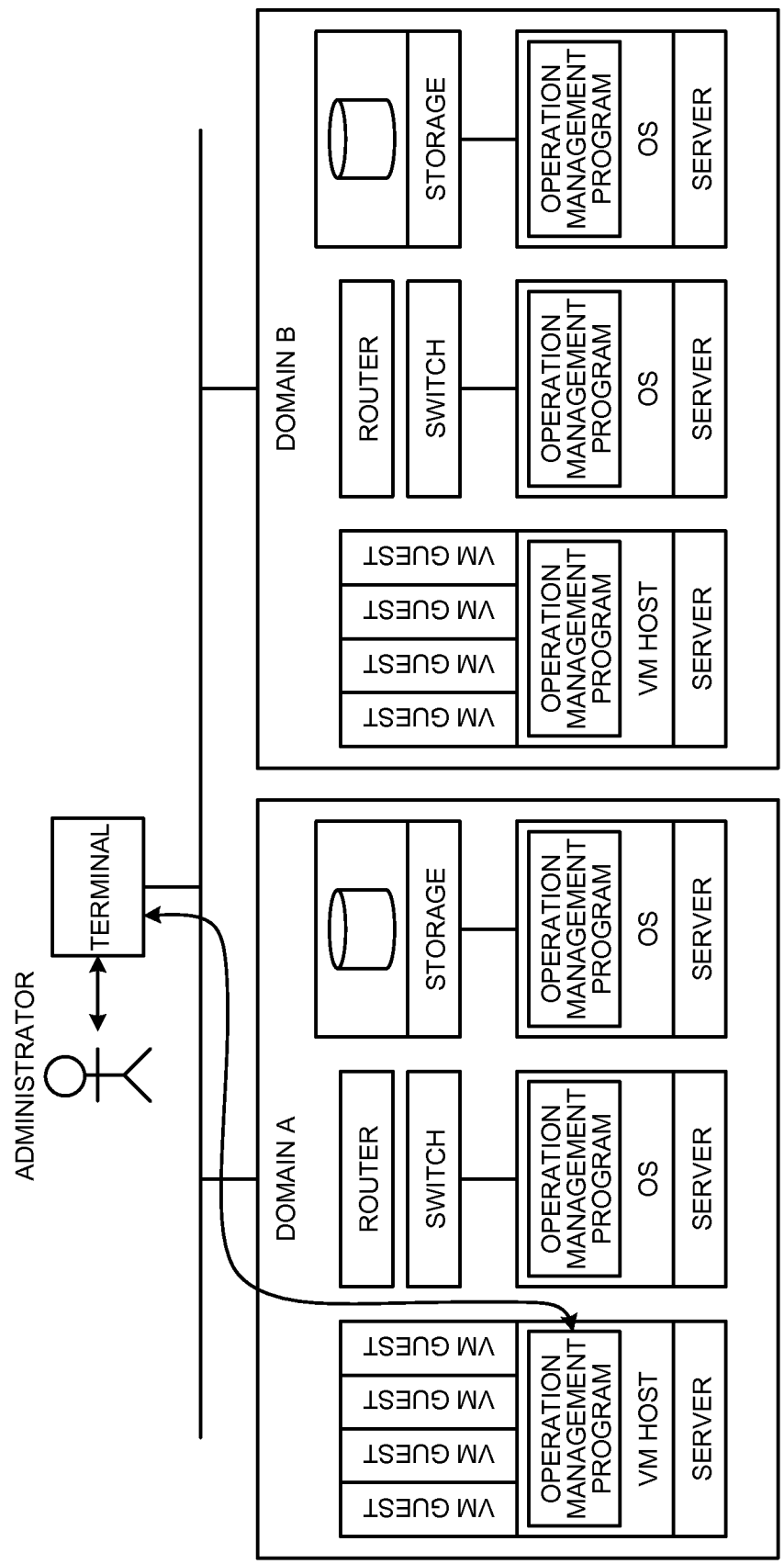
FIG. 4 is an illustration of implementation of a management program.
Figure 5:
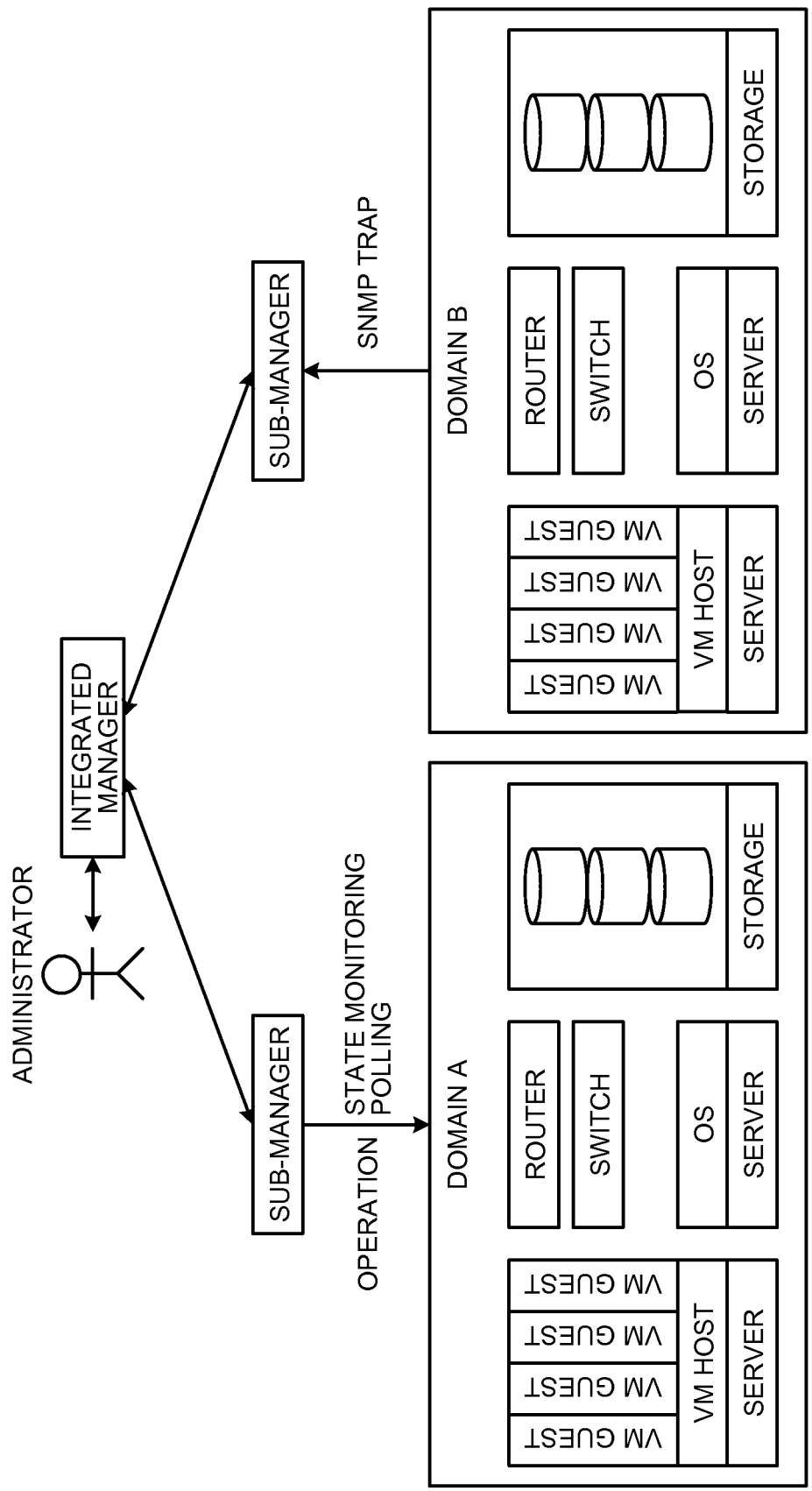
FIG. 5 is an illustration of hierarchized management.

As illustrated in FIG. 4, the operation management program can acquire information of nodes belonging to the domain of the operation management program without hierarchizing the management. FIG. 5 is a comparative example of FIG. 4 and is an illustration of hierarchized management.

A system illustrated in FIG. 5 is provided with a sub-manager that manages the domain A and a sub-manager that manages the domain B. An integrated manager manages the two sub-managers.

The sub-manager performs state monitoring polling on apparatuses belonging to the domain managed by the sub-manager by using SNMP or the like. The sub-manager collects information from the apparatuses belonging to the domain managed by the sub-manager by receiving an event such as an SNMP trap.

When the management is hierarchized in this way, different apparatuses or programs are prepared for each hierarchy level. An event is propagated from the object to be managed to the sub-manager and further propagated from the sub-manager to the integrated manager, so that the CPU load of each manager and the load of the network increase.

On the other hand, the management programs illustrated in FIG. 4 are the same program distributed to each server and are not differentiated to programs for the integrated manager and the sub-manager. The management program need not be installed separately in a computer for the integrated manager and a computer for the sub-manager, but runs on all objects to be managed. Therefore, it is possible to directly transmit and receive an event to and from an object to be monitored and an object to be managed need not be polled, so that the CPU load and the network load can be reduced.

Figure 6:
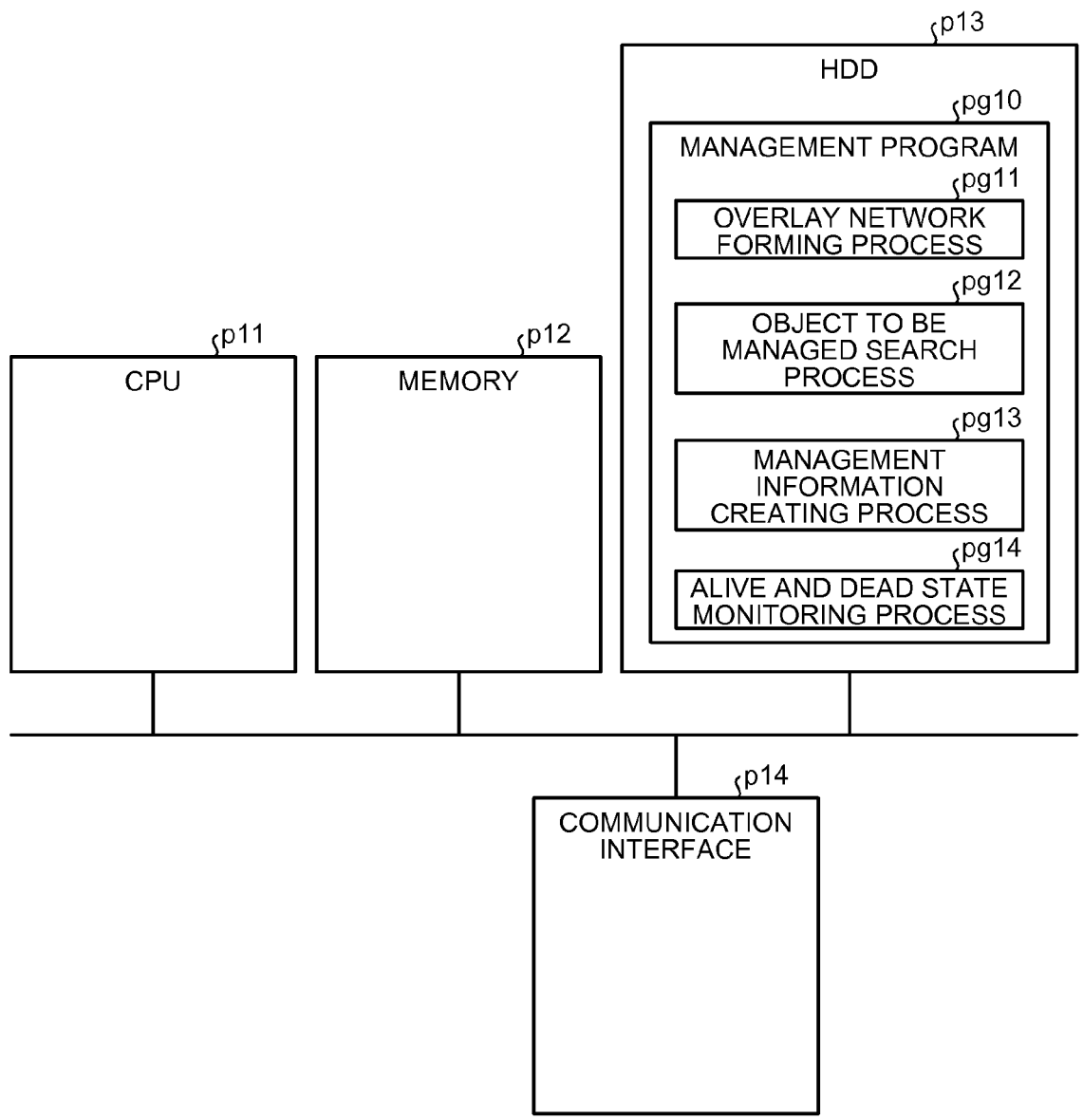
FIG. 6 is an illustration of a relationship between server hardware and the management program.

FIG. 6 is an illustration of a relationship between server hardware and the management program. A management program pg10 is stored in an HDD (hard disk drive) p13 in the server. The management program pg10 includes an overlay network forming process pg11 in which an operation of an overlay network forming unit is described, an object to be managed search process pg12 in which an operation of an object to be managed search unit is described, a management information creating process pg13 in which an operation of a management information creating unit is described, and an alive and dead state monitoring process pg14 in which an operation of an alive and dead state monitoring unit is described.

When the server starts, the management program pg10 is read from the HDD p13 and deployed in a memory p12. Then, the CPU (Central Processing Unit) p11 sequentially executes the program deployed in the memory, so that the CPU p11 causes the server to function as a management apparatus. At this time, a communication interface p14 of the server is used as an interface of the overlay network in the management apparatus.

Figure 7:
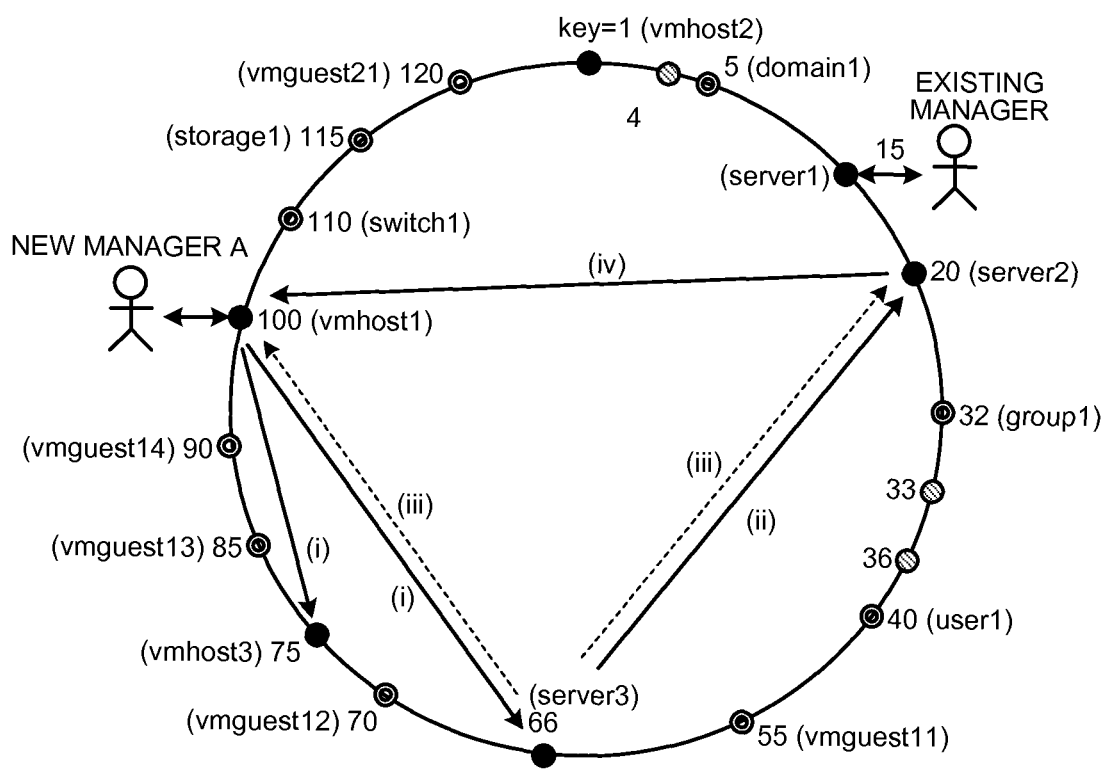
FIG. 7 is an illustration of an overlay network.

FIG. 7 is an illustration of the overlay network. When the management apparatus or the management program starts, the starting one forms the overlay network. When the overlay network forming unit m11 uses, for example, a DHT (Distributed Hash Table) algorithm "Chord", a ring-shaped overlay network as illustrated in FIG. 7 is formed.

In the DHT, a pair of Key and Value is distributed and held by each node that joins the overlay network. In the case of Chord, a value hashed by SHA (Secure Hash Algorithm)-1 is used as the key. Each key is stored in the first node which has a key, the value of which is greater than that of the key of its own, and in which the management program runs.

In the example of FIG. 7, the key of vmhost2 is 1, the key of domain1 is 5, the key of server1 is 15, the key of server2 is 20, the key of group1 is 32, the key of user1 is 40, and the key of vmguest11 is 55. Similarly, the key of server3 is 66, the key of vmguest12 is 70, the key of vmhost3 is 75, the key of vmguest13 is 85, and the key of vmguest14 is 90. Further, the key of vmhost1 is 100, the key of switch1 is 110, the key of storage1 is 115, and the key of vmguest21 is 120.

Here, the vmhost1 to the vmhost3 and the server1 to the server3 belong to domain1, are nodes in which the management program is executed, and are represented by a black circle in FIG. 7. The vmguest, the storage, the switch, and the like, which belong to the domain1, are represented by a double circle in FIG. 7. In addition, in FIG. 7, nodes that belong to domain2 (nodes whose keys are 4, 33, and 36) are represented by a shaded circle in FIG. 7.

As described above, each pair of key and value is stored in the first node which has a key, the value of which is greater than that of the key of its own, so that the Keys 40 and 55 are stored in the nodes whose Key is 66.

In the case of Chord, each node holds information of a node immediately before the node, a node immediately after the node, and a node of (key of the node+$2^{(x-1)}$) mod($2^k$) (x is a natural number from 1 to k, k is the number of bits of key) as routing information. Specifically, each node has information of discrete nodes such as 1, 2, 4, 8, 16, 32, 64, 128, and so on.

Thereby, in Chord DHT, each node can cause a node which has a first Key greater than the Key of the node to hold a Value corresponding to the Key, and further, each node can acquire a Value corresponding to the Key from a node which has a first Key greater than the Key of the node.

Further, in the example illustrated in FIG. 7, the vmhost1 of Key 100 is a new manager and the new manager applies for subscription (i) to the vmhost3 of Key 75 and the server3 of Key 66. The server3 of Key 66 requests the server2 of Key 20 to monitor the server3 of Key 66 (ii). Thereafter, if a down event (iii) occurs in the server3 of Key 66, the vmhost1 of Key 100 directly detects the down event and the server2 of Key 20 notifies the vmhost1 of Key 100 of the down event (iv).

FIG. 8 is an illustration of a specific example of a definition of the DHT (Distributed Hash Table). The DHT corresponds to a hash table t1 in SAN of FIG. 3.

In FIG. 8, a node name is used as a key to hash and a value corresponding to the key is represented.

Regarding the server, the server name is hashed by SHA-1 to obtain the Key. The value includes a tag "server" representing a server, a server name, a key obtained from the server name, a list of IP addresses (IP list) held by the server, a list of WWNs held by the server (WWN list), a manager-flag indicating whether or not the server functions as a management node, and a domain to which the server belongs and a list of keys of the domain.

Regarding the VM host, the VM host name is hashed by SHA-1 to obtain the Key. The value includes a tag "vmhost" representing a VM host, a VM host name, a key obtained from the VM host name, an IP list of the VM host, a domain to which the VM host belongs and a list of keys of the domain, and a list of VM guests which runs on the VM host.

Regarding the VM guest, the VM guest name is hashed by SHA-1 to obtain the Key. The value includes a tag "vmguest" representing a VM guest, a VM guest name, a key obtained from the VM guest name, an IP list of the VM guest, and a name and a key of the VM host on which the VM guest runs.

Regarding the switch, the switch name is hashed by SHA-1 to obtain the Key. The value includes a tag "switch" representing a switch, a switch name, a key obtained from the switch name, an IP list of the switch, and a domain to which the switch belongs and a list of keys of the domain.

Regarding the storage, the storage name is hashed by SHA-1 to obtain the Key. The value includes a tag "storage" representing a storage, a storage name, a key obtained from the storage name, an IP list of the storage, a WWN list of the storage, and a domain to which the storage belongs and a list of keys of the domain.

Regarding the user, the user name is hashed by SHA-1 to obtain the Key. The value includes a tag "user" representing a user, a user name, a key obtained from the user name, and a name of a group to which the user belongs and a list of keys of the group.

Regarding the group, the group name is hashed by SHA-1 to obtain the Key. The value includes a tag "group" representing a group, a group name, a key obtained from the group name, and a list of users and keys that belong to the group.

Regarding the domain, the domain name is hashed by SHA-1 to obtain the Key. The value includes a tag "domain" representing a domain, a domain name, a key obtained from the domain name, and a list of keys of a management apparatus of the domain.

FIG. 9 is a specific example of a self node table t2 illustrated in FIG. 3. FIG. 9 illustrates a self node table created by a management program running on the vmhost1 along with the vmguest11 to the vmguest14. The self node table includes items of type, node name, key, IP, and WWN.

In the example of FIG. 9, an entry in which the type is vmhost, the node name is vmhost1.domain1.company.com, the key is 100, the IP is 10.20.30.40, and the WWN is 10:00:00:60:69:00:23:74 is registered. Also, an entry in which the type is vmguest, the node name is vmguest11.domain1.company.com, the key is 55, the IP is 10.20.30.41, and the WWN is null is registered.

Similarly, an entry in which the type is vmguest, the node name is vmguest12.domain1.company.com, the key is 70, the IP is 10.20.30.42, and the WWN is null is registered. Further, an entry in which the type is vmguest, the node name is vmguest13.domain1.company.com, the key is 85, the IP is 10.20.30.43, and the WWN is null and an entry in which the type is vmguest, the node name is vmguest14.domain1.company.com, the key is 90, the IP is 10.20.30.44, and the WWN is null are registered.

FIG. 10 is a specific example of a domain table t3 illustrated in FIG. 3. Each management apparatus and each management program hash a name of the domain to which the node belongs by SHA-1 to obtain the key and register the key in the domain table t3. In addition to the domain name and the key of the domain, a key of a manager that manages the domain is registered in the domain table t3.

FIG. 11 is a specific example of a node management table t4 illustrated in FIG. 3. The node management table t4 is management information created by a management apparatus and a management program which operate as a manager that manages the nodes in the domain.

The node management table t4 in FIG. 11 illustrates a table created and held by the manager (Key 100, vmhost1) that manages the domain1 in the overlay network illustrated in FIG. 7. Since FIG. 11 illustrates the node management table t4 of Key 100 and vmhost1, the alive and dead state monitoring notification destination is blank in all fields. In the node management table t4 of Key 20 and server2, the Key 66 and server3 is monitored and a monitoring result is notified to the Key 100 and vmhost1, so that the alive and dead state monitoring notification destination of the entry of the server3 is 100.

The node management table t4 illustrated in FIG. 11 is an example of the node management table of the new manager (vmhost1, key 100) in FIG. 7 and includes items (columns) of type, node name, key, Domain key, Manager Flag, Managed Flag, alive and dead state monitoring flag, and alive and dead state monitoring notification destination. The Manager Flag has a value of true when the node is a manager and has a value of false when the node is not a manager. The Managed Flag has a value of true when the node is managed and has a value of false when the node is not managed. The alive and dead state monitoring flag has a value of true for a node to be monitored when the node of the node management table t4 operates as an application source node, has a value of false for a node not to be monitored, and has a value of NULL for a node that will not be monitored. The item of the alive and dead state monitoring notification destination indicates a key of a notification destination to which a monitoring result of the node is notified when the node operates as a monitoring node.

Specifically, the node management table t4 illustrated in FIG. 11 has an entry in which the type is vmhost, the node name is vmhost2.domain1.company.com, the Key is 1, the Domain Key is 5, the Manager Flag is false, the Managed Flag is true, the alive and dead state monitoring flag is false, and the alive and dead state monitoring notification destination is blank.

Also, the node management table t4 has an entry in which the type is server, the node name is server1.domain1.company.com, the Key is 15, the Domain Key is 5, the Manager Flag is true, the Managed Flag is true, the alive and dead state monitoring flag is false, and the alive and dead state monitoring notification destination is blank.

Also, the node management table t4 has an entry in which the type is server, the node name is server2.domain1.company.com, the Key is 20, the Domain Key is 5, the Manager Flag is false, the Managed Flag is true, the alive and dead state monitoring flag is false, and the alive and dead state monitoring notification destination is blank.

Also, the node management table t4 has an entry in which the type is vmguest, the node name is vmguest11.domain1.company.com, the Key is 55, the Domain Key is 5, the Manager Flag is false, the Managed Flag is true, the alive and dead state monitoring flag is NULL, and the alive and dead state monitoring notification destination is blank.

Also, the node management table t4 has an entry in which the type is server, the node name is server3.domain1.company.com, the Key is 66, the Domain Key is 5, the Manager Flag is false, the Managed Flag is true, the alive and dead state monitoring flag is true, and the alive and dead state monitoring notification destination is blank.

Also, the node management table t4 has an entry in which the type is vmguest, the node name is vmguest12.domain1.company.com, the Key is 70, the Domain Key is 5, the Manager Flag is false, the Managed Flag is true, the alive and dead state monitoring flag is NULL, and the alive and dead state monitoring notification destination is blank.

Also, the node management table t4 has an entry in which the type is vmhost, the node name is vmhost3.domain1.company.com, the Key is 75, the Domain Key is 5, the Manager Flag is false, the Managed Flag is true, the alive and dead state monitoring flag is true, and the alive and dead state monitoring notification destination is blank.

Also, the node management table t4 has an entry in which the type is vmguest, the node name is vmguest13.domain1.company.com, the Key is 85, the Domain Key is 5, the Manager Flag is false, the Managed Flag is true, the alive and dead state monitoring flag is NULL, and the alive and dead state monitoring notification destination is blank.

Also, the node management table t4 has an entry in which the type is vmguest, the node name is vmguest14.domain1.company.com, the Key is 90, the Domain Key is 5, the Manager Flag is false, the Managed Flag is true, the alive and dead state monitoring flag is NULL, and the alive and dead state monitoring notification destination is blank.

Also, the node management table t4 has an entry in which the type is vmhost, the node name is vmhost1.domain1.company.com, the Key is 100, the Domain Key is 5, the Manager Flag is true, the Managed Flag is true, the alive and dead state monitoring flag is NULL, and the alive and dead state monitoring notification destination is blank.

Also, the node management table t4 has an entry in which the type is switch, the node name is switch1.domain1.company.com, the Key is 110, the Domain Key is 5, the Manager Flag is false, the Managed Flag is true, the alive and dead state monitoring flag is NULL, and the alive and dead state monitoring notification destination is blank.

Also, the node management table t4 has an entry in which the type is storage, the node name is storage1.domain1.company.com, the Key is 115, the Domain Key is 5, the Manager Flag is false, the Managed Flag is true, the alive and dead state monitoring flag is NULL, and the alive and dead state monitoring notification destination is blank.

Also, the node management table t4 has an entry in which the type is vmguest, the node name is vmguest21.domain1.company.com, the Key is 120, the Domain Key is 5, the Manager Flag is false, the Managed Flag is true, the alive and dead state monitoring flag is NULL, and the alive and dead state monitoring notification destination is blank.

Since the node management table t4 is a table for managing the nodes belonging to the domain 1, the nodes belonging to the domain 2 are not registered in the node management table t4.

FIG. 12 is a specific example of a routing table t5 illustrated in FIG. 3. The routing table t5 is a table used by each management apparatus and each management program for routing in the overlay network.

In the example illustrated in FIG. 12, the routing table t5 includes items of distance indicating a key of a goal destination which is a final destination address, node name of the goal destination, Destination Key which is a key of a destination address indicating a routing destination when communicating with the goal destination, and Destination IP which is an IP address of the routing destination.

FIG. 12 is a specific example of the routing table used by a node of Key 100. The routing table t5 in FIG. 11 has items in which the distance is 1, the node name is vmhost1.domain1.company.com, the Destination Key is 1, and the Destination IP is a1.b1.c1.d1 and items in which the distance is 2, the node name is vmhost2.domain1.company.com, the Destination Key is 1, and the Destination IP is a1.b1.c1.d1.

Also, the routing table t5 has items in which the distance is 3, the node name is vmhost2.domain1.company.com, the Destination Key is 1, and the Destination IP is a1.b1.c1.d1.

Also, the routing table t5 has items in which the distance is 5, the node name is vmhost2.domain1.company.com, the Destination Key is 1, and the Destination IP is a1.b1.c1.d1.

Also, the routing table t5 has items in which the distance is 9, the node name is vmhost2.domain1.company.com, the Destination Key is 1, and the Destination IP is a1.b1.c1.d1.

Also, the routing table t5 has items in which the distance is 17, the node name is vmhost2.domain1.company.com, the Destination Key is 1, and the Destination IP is a1.b1.c1.d1.

Also, the routing table t5 has items in which the distance is 33, the node name is node1.domain2.company.com, the Destination Key is 4, and the Destination IP is a4.b4.c4.d4.

Also, the routing table t5 has items in which the distance is 65, the node name is node3.domain2.company.com, the Destination Key is 36, and the Destination IP is a36.b36.c36.d36.

In this way, the routing table t5 defines routing to Key 1 (IP: a1.b1.c1.d1) when the nodes (key: 1, 2, 3, 5, 9, and 17) which belong to the domain 1 are the goal destination. Also, the routing table t5 defines routing to Key 4 (IP: a4.b4.c4.d4) when the node key: 33 which belongs to the domain 2 is the goal destination and defines routing to Key 36 (IP: a36.b36.c36.d36) when the node key: 65 which belongs to the domain 2 is the goal destination.

Figure 13:
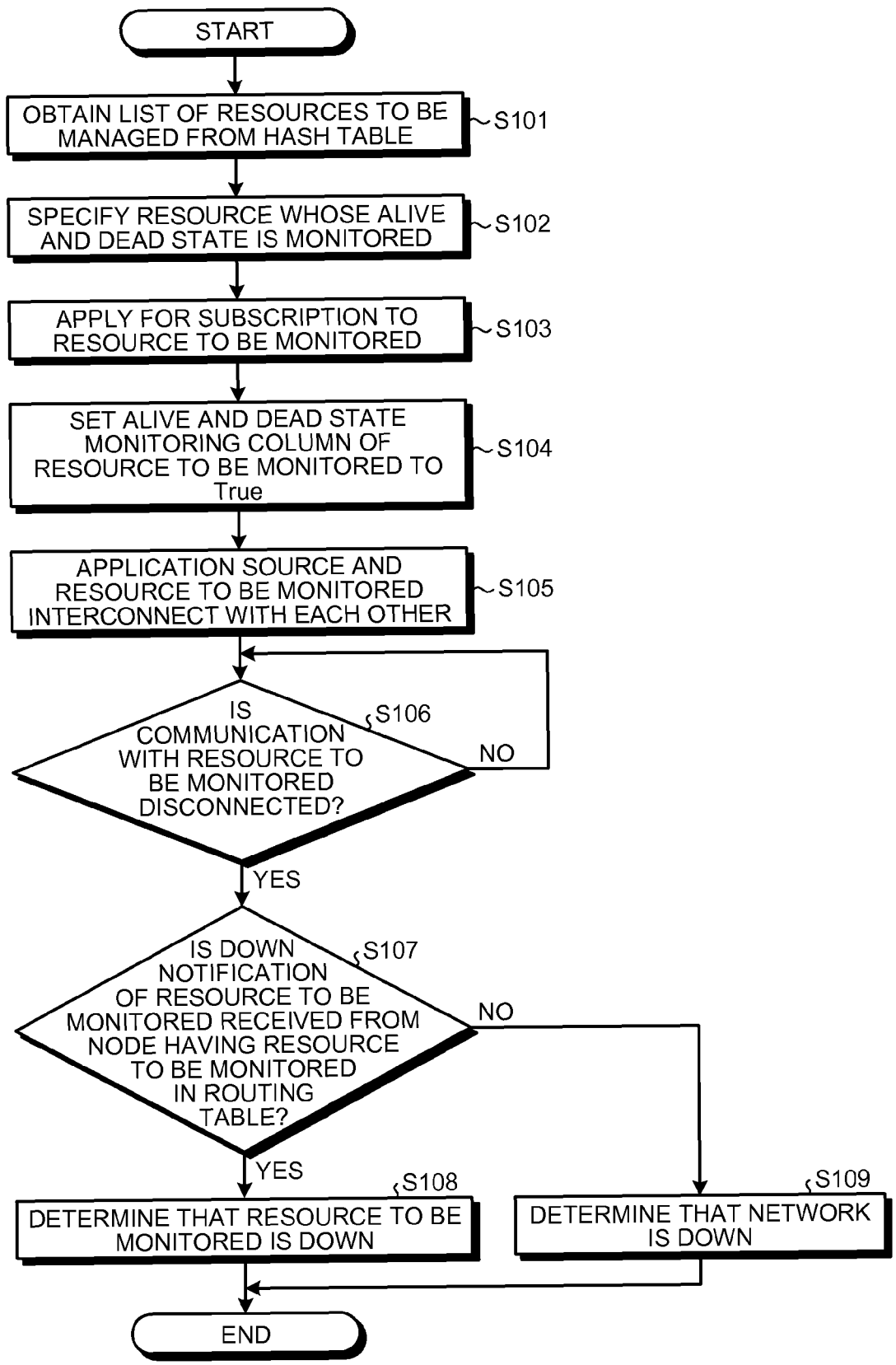
FIG. 13 is a flowchart for explaining a processing operation of an application source node.

FIG. 13 is a flowchart for explaining a processing operation of the application source node. In FIG. 13, an example will be described in which the manager A (Key 100) in FIG. 7 applies for subscription of the Key 66 and the Key 75. First, an administrator connects to a management GUI (Graphical User Interface) of the manager A (Key 100) and obtains a list of resources to be managed which join the domain from the hash table t1 (S101).

The application source node specifies resources to be managed, whose alive and dead state is monitored (S102). Here, as illustrated in FIG. 7, the application source node specifies the Key 66 and the Key 75. Regarding the resources to be managed, resources to be managed belonging to the same business task may be automatically specified or resources to be managed having the same attribute (for example, vmhost) may be automatically selected. Alternatively, an operator may individually specify the resources to be managed.

The operation management program of the manager A acquires IPs from the Keys of the specified resources and applies for subscription to the alive and dead state monitoring services of the resources to be managed (S103). At this time, the manager sets flags of the resources to be managed whose alive and dead state monitoring service is subscribed among the flags in alive and dead state monitoring columns in the node management table t4 to True (S104).

At this point in time, an interconnection begins between the operation management program of the manager A that is the application source and the operation management programs of the resources to be managed (Key 66 and Key 75 in FIG. 7) (S105). The interconnection is, for example, a TCP connection in which a Keep Alive option is enabled. When the connection is disconnected, an event is propagated to the operation management programs of the manager A and the resources to be managed (Key 66 and Key 75 in FIG. 7).

When communication with a node to be monitored is disconnected (S106, Yes), the operation management program of the manager A that is the application source determines whether or not a dead state event of the node to be monitored is received from the monitoring node having the node to be monitored in the routing table (S107).

When the dead state event is received from the monitoring node, the operation management program of the manager A that is the application source determines that the node to be monitored is down (S108) and ends the process. On the other hand, when the dead state event is not received from the monitoring node, the operation management program of the manager A that is the application source determines that the network is down (S109) and ends the process.

Figure 14:
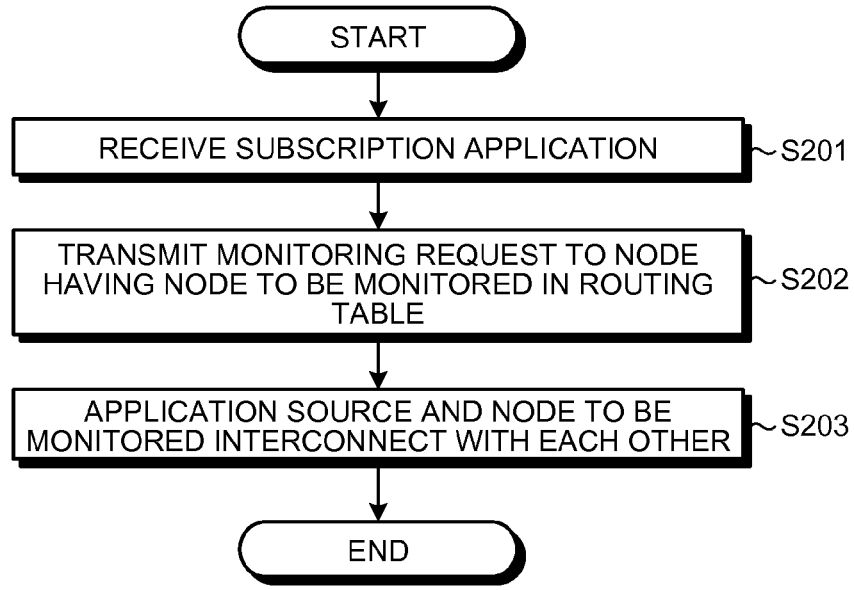
FIG. 14 is a flowchart for explaining a processing operation of a node to be monitored.

FIG. 14 is a flowchart for explaining a processing operation of the node to be monitored. In FIG. 14, an example will be described in which the Key 66 and the Key 75 in FIG. 7 receive a subscription application from the manager A (Key 100).

When the monitoring request unit of the nodes to be monitored (Key 66 and Key 75 in FIG. 7) receives the subscription application (S201), the monitoring request unit transmits a monitoring request to each node having the node to be monitored in the routing table so that each node notifies the manager A that the node to be monitored is dead when the node to be monitored does not respond (S202). In the example of FIG. 7, the monitoring request is transmitted from the Key 66 to the Key 20.

Thereafter, the nodes to be monitored (Key 66 and Key 75 in FIG. 7) interconnect with the application source node (Key 100 in FIG. 7) (S203). Therefore, when a node to be monitored is dead, an event is transmitted to the application source node and the event is also transmitted to the monitoring node that monitors the node to be monitored.

Figure 15:
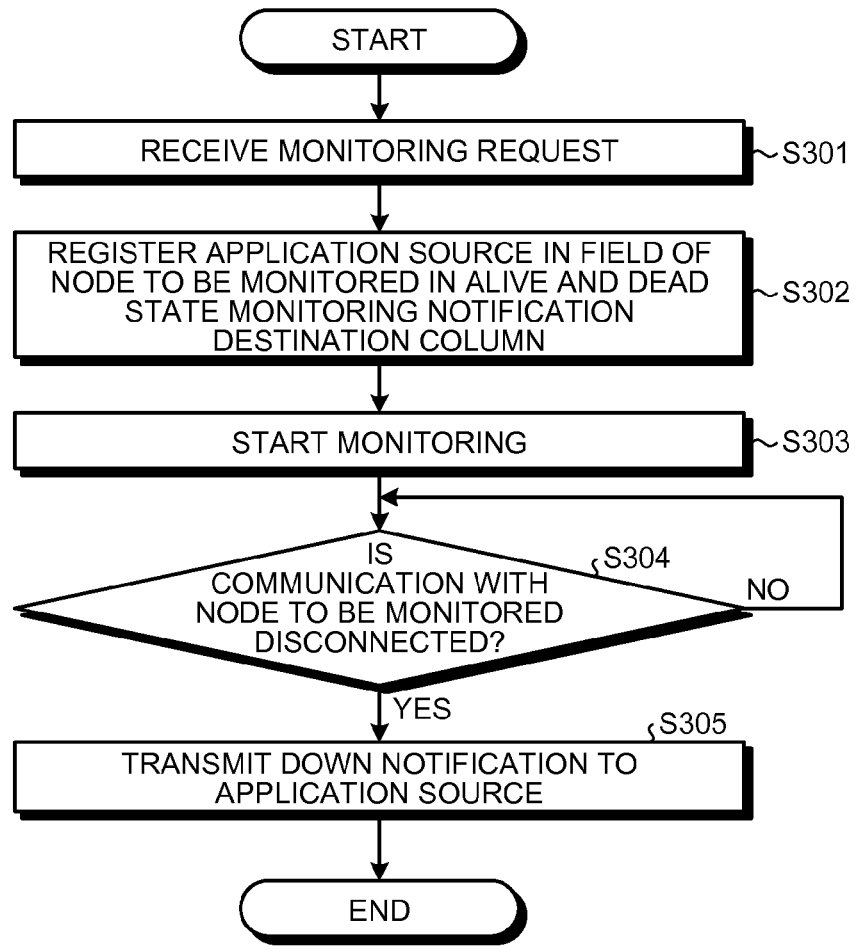
FIG. 15 is a flowchart for explaining a processing operation of a monitoring node.

FIG. 15 is a flowchart for explaining a processing operation of the monitoring node. In FIG. 15, an example will be described in which the Key 20 in FIG. 7 receives a monitoring request from the Key 66.

The monitoring node (Key 20) receives monitoring request from the node to be monitored (Key 66) (S301) and registers the Key 100 which is the application source node in a field of the node to be monitored (key 66) in the alive and dead state monitoring notification destination column in the node management table t4 included in the monitoring node (key 20) (S302).

Thereafter, the monitoring node (Key 20) starts monitoring the node to be monitored (Key 66) (S303), and when the connection with the node to be monitored (Key 66) is disconnected (S304, Yes), the monitoring node (Key 20) transmits a down notification to the application source node Key 100 (S305).

In this way, when the node to be monitored abends and turns OFF from ON, as the monitoring node, each node having the node to be monitored in the routing table notifies the application source node that the node to be monitored is dead.

When the node to be monitored terminates normally and turns OFF from ON, the node to be monitored may notify the application source node that the node to be monitored terminates normally. When the node to be monitored turns ON from OFF, the node to be monitored notifies the node Key 100 that the monitoring node is alive.

As described above, in the management system, the management apparatus, the management method, and the management program according to the present embodiment, the application source node N1 interconnects with the node to be monitored N2, causes the monitoring node N3 to monitor the node to be monitored N2, and performs determination by combining the direct response from the node N2 and the notification from the monitoring node N3. Therefore, it is possible to quickly detect a state change of an object to be managed and distinguish between a failure of the node to be monitored N2 and a failure of the network.

According to the management system, the management apparatus and the management method disclosed by the present application, it is possible to quickly detect a state change of an object to be managed.

All examples and conditional language recited herein are intended for pedagogical purposes of aiding the reader in understanding the invention and the concepts contributed by the inventor to further the art, and are not to be construed as limitations to such specifically recited examples and conditions, nor does the organization of such examples in the specification relate to a showing of the superiority and inferiority of the invention. Although the embodiment of the present invention has been described in detail, it should be understood that the various changes, substitutions, and alterations could be made hereto without departing from the spirit and scope of the invention.

What is claimed is:

1. A management system comprising:
a plurality of nodes, a node from among the plurality of nodes operating as an application source node, a node to be monitored or a monitoring node, wherein:
the application source node applies for subscription of alive and dead state information to the node to be monitored;
the node to be monitored, upon receiving the applied subscription, makes a connection with the application source node and makes a request to the monitoring node whose routing table includes the node to be monitored for monitoring the node to be monitored and notifying the application source node of a monitoring result;
the monitoring node monitors the node to be monitored upon receiving the request from the node to be monitored and makes a down notification to the application source node upon not receiving a response from the node to be monitored, the down notification notifying that the node to be monitored is down; and
the application source node determines that the node to be monitored stops, upon detecting that the connection is disconnected and receiving the down notification from the monitoring node, and that a problem occurs in a communication line with the node to be monitored upon detecting that the connection is disconnected and not receiving the down notification from the monitoring node.

2. The management system according to claim 1, wherein the application source node, the node to be monitored, and the monitoring node are nodes on an overlay network using a distributed hash.

3. A management apparatus operating as an application source node, a node to be monitored or a monitoring node, the managing apparatus comprising a memory and a processor coupled to the memory, the processor being configured to execute a process including:
applying for subscription of alive and dead state information to the node to be monitored;
making a connection with the application source node, upon receiving the applied subscription from the application source node, and making a request to the monitoring node whose routing table includes a node of the management apparatus for monitoring the node of the management apparatus and notifying the application source node of a monitoring result;
monitoring, upon receiving the request from the node to be monitored to monitor the node to be monitored and notify the application source node of the monitoring result, the node to be monitored and making a down notification to the application source node upon not receiving a response from the node to be monitored, the down notification notifying that the node to be monitored is down; and
determining that the node to be monitored stops, upon detecting that the connection is disconnected and receiving the down notification from the monitoring node that monitors the node to be monitored, and that a problem occurs in a communication line with the node to be monitored upon detecting that the connection is disconnected and not receiving the down notification from the monitoring node.

4. A management method, used for a management system including a plurality of nodes, a node from among the plurality of nodes operating as an application source node, a node to be monitored or a monitoring node, the management method comprising:
applying, by the application source node, for subscription of alive and dead state information to the node to be monitored;
making a connection with the application source node, by the node to be monitored, upon receiving the applied subscription, and making a request to the monitoring node whose routing table includes the node to be monitored for monitoring the node to be monitored and notifying the application source node of a monitoring result;
monitoring, by the monitoring node, the node to be monitored upon receiving the request from the node to be monitored, and making a down notification to the application source node upon not receiving a response from the node to be monitored, the down notification notifying that the node to be monitored is down; and
determining, by the application source node, that the node to be monitored stops, upon detecting that the connection is disconnected and receiving the down notification from the monitoring node, and that a problem occurs in a communication line with the node to be monitored upon detecting that the connection is disconnected and not receiving the down notification from the monitoring node.

5. A non-transitory computer-readable recording medium having stored therein a management program causing a computer to execute a process, the computer operating as an application source node, a node to be monitored or a monitoring node, the process comprising:
applying, by the application source node, for subscription of alive and dead state information to the node to be monitored;
making a connection with the application source node, by the node to be monitored upon receiving the applied subscription from the application source node, and making a request to the monitoring node whose routing table includes the node to be monitored for monitoring the node to be monitored and notifying the application source node of a monitoring result;
upon receiving, by the monitoring node, the request from the node to be monitored to monitor the node to be monitored and notify the application source node of the monitoring result, monitoring the node to be monitored and making a down notification to the application source node upon not receiving a response from the node to be monitored, the down notification notifying that the node to be monitored is down; and
determining, by the application source node, that the node to be monitored stops, upon detecting that the connection is disconnected and receiving the down notification from the monitoring node that monitors the node to be monitored, and that a problem occurs in a communication line with the node to be monitored upon detecting that the connection is disconnected and not receiving the down notification from the monitoring node.

* * * * *